March 20, 1945.  J. M. G. FULLMAN  2,371,753
STUFFING BOX
Filed July 27, 1942

INVENTOR
James M. G. Fullman
BY
ATTORNEYS

Patented Mar. 20, 1945

2,371,753

UNITED STATES PATENT OFFICE 2,371,753

STUFFING BOX

James M. G. Fullman, Sewickley, Pa., assignor to National Electric Products Corporation, a corporation of Delaware Application July 27, 1942, Serial No. 452,390

2 Claims. (Cl. 286—35)

This invention relates to stuffing boxes and particularly to those intended for use where stationary objects, such as cables and pipes, pass through openings in partitions or walls of water-tight compartments of ships and the like.

Stuffing boxes now used for this, and similar purposes, are bulky and expensive because the parts are made from fairly heavy metal stock and considerable machining is required. In those types in which the packing is compressed by a rotary gland, the end of the gland either rotates directly in contact with the packing or against a separate metal bush, or washer, interposed between the end of the gland and the packing. In one case the packing offers considerable frictional resistance to the turning of the gland; there is no direct compression of the packing; and the gland produces a twisting action on the packing. In the other case the bush or washer is easily lost; it constitutes an additional part to handle; and it must be separately removed when repacking is necessary. Its removal is generally difficult especially in the case of a flat washer since it is left far down in the box when the gland is removed.

According to this invention all parts of the stuffing box are made of sheet metal. Preferably each part is a piece of metal tubing and very little machining is required. The gland member is a composite one made up of a gland sleeve and a gland bush. The end of the gland sleeve does not act directly upon the packing, but upon the gland bush, which in turn bears on the packing and compresses it by a direct axial but non-rotary movement when the gland sleeve is actuated. The gland bush is loosely but permanently connected to the gland sleeve and when the latter is removed it withdraws the gland bush with it. Being inseparable from the gland sleeve the gland bush is not easily lost. The arrangement is such that the gland sleeve does not make contact with the surface of the cable or other object passing through it and therefore does not injure the surface of the object when the sleeve is turned.

A stuffing box embodying the invention is illustrated in the accompanying drawing which shows the stuffing box associated, by way of example, with a cable where it passes through an opening in a wall or partition. In the drawing.

Figure 1:
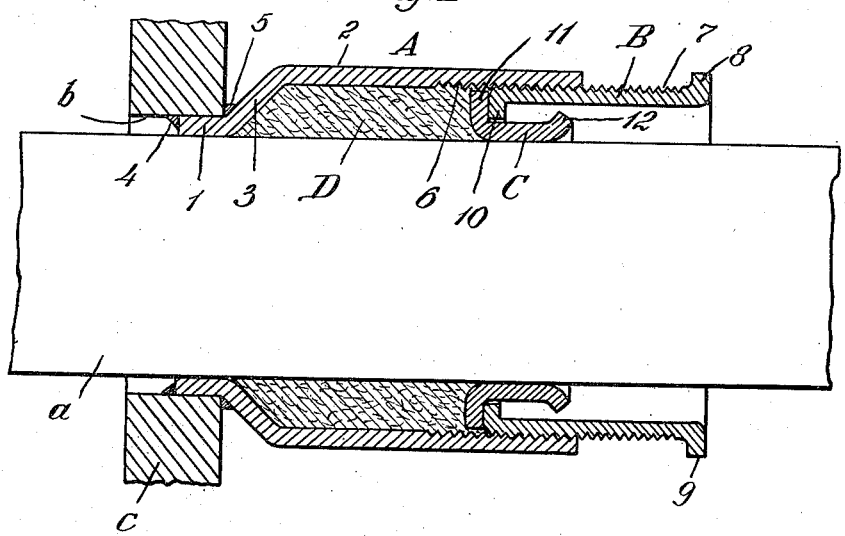
Figure 1 is a longitudinal section through the stuffing box.

The object in connection with which the stuffing box is used is represented at $a$. This may be a cable, pipe, or any other object which passes through an opening $b$ located, for instance, in a wall or partition $c$ of a water-tight compartment of a ship. The stuffing box is employed to prevent leakage of water and air through the opening $b$ around the object.

In its preferred form the stuffing box comprises three metallic parts shown at A, B and C, and a packing D. Each of the three metal parts is preferably made from metal tubing. The part A constitutes the box proper. It is so shaped as to provide a neck 1 of relatively small diameter and a body portion 2 of larger diameter interconnected by a tapered portion 3. The neck 1 is adapted to receive the cable or other object $a$ with a rather close fit and the space within the box between the body portion 2 and the surface of the object is adapted to receive the packing D.

The box may be secured to the wall $c$ in any suitable way that will afford a tight joint, for instance, the neck 1 may be inserted in the opening $b$ as shown in the drawing and if desired may be welded therein as indicated at 4 and 5.

Figure 2:
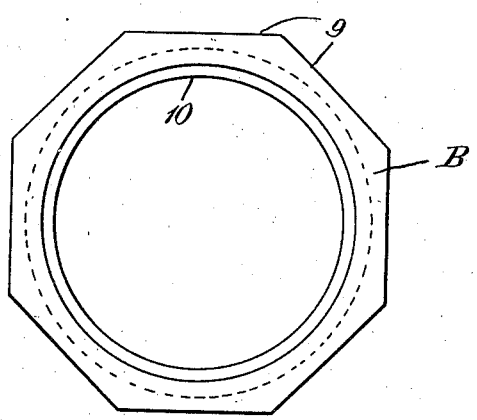
Fig. 2 is an end view of the gland sleeve.

The rear end of the box remote from the neck 1 is internally threaded as shown at 6 to receive the composite gland which is made up of the two parts B and C. The part B, which I call the gland sleeve, is externally threaded as shown at 7 so that it may be screwed into the threaded end of the box. The end 8 of the gland sleeve may be formed in the shape of a nut 9, as shown in Fig. 2, to facilitate turning it by means of a wrench.

As shown in Fig. 1 the internal diameter of the cylindrical portion of the gland sleeve B is greater than the external diameter of the object $a$ and at its forward end nearest the packing is provided with an integral inwardly directed flange 10. This flange clears the object $a$ to leave space for the other part C of the gland.

The part C, which I call the gland bush, is a short length of metal tubing whose internal diameter is approximately the same as the external diameter of the object $a$. At one end the gland bush has an integral outwardly directed flange 11 which lies between the packing D and the flange 10 on the gland sleeve. At its other end the gland bush has a second integral outwardly directed flange 12 behind the flange 10 on the sleeve. The arrangement is such that the gland bush is inseparable from the gland sleeve even when the gland sleeve is removed from the box. Also the cylindrical mid-portion of the bush C affords a bearing for the object $a$, so that if the object is bent sidewise the stress is not applied entirely at the joint with the wall $c$.

To install the stuffing box the part A is attached to the wall c, as above described, and then the cable or other object a is inserted into the stuffing box. The gland sleeve B is then turned by means of a wrench applied to the nut 9 to advance it into the part A. The flange 10 engaging with the flange 11 on the gland bush C moves the latter axially to apply a frontal pressure on the packing and thereby compresses the packing D. The tapered inner surface of the portion 3 forces the packing in the converging zone of the packing space tightly against the surface of the object a in the well known manner.

When it is desired to repack the stuffing box, the gland sleeve B is turned in the opposite direction to withdraw it from the box A. The flange 10 on the gland sleeve will then engage with the flange 12 on the gland bush, so that when the gland sleeve is withdrawn from the box it will also withdraw the gland bush. No difficulty is encountered in withdrawing the gland bush since the single act of removing the gland sleeve also removes the gland bush. Being permanently attached to the gland sleeve, the gland bush cannot readily be lost.

The gland bush compresses the packing D with a direct axial non-rotary movement. The flange 10 on the inner end of the gland sleeve does not rotate in direct contact with the packing due to the interposition of the flange 11 on the gland bush. Thus there is no relative rotation between any metal part of the stuffing box and the packing. When the gland sleeve is turned it has no abrasive frictional action on the surface of the cable since the gland sleeve is spaced away from and is out of contact with the surface of the cable.

The improved stuffing box is simple in construction and inexpensive to manufacture. It lends itself well to mass production with a minimum of machinery. The use of sheet metal, such as tubing, for all of the parts reduces the amount of metal required and lessens the amount of machining.

It should be understood that the stuffing box is not limited to the uses mentioned above for it may be used in many of the relations where the usual type of stuffing box is used.

I claim:

1. In a stuffing box for a cylindrical object comprising a cylindrical box having a body portion of larger diameter than the object to be packed and having a forward neck portion of substantially the diameter of the object, thereby forming a packing space, and a tapering wall between said portions to form a converging forward zone in said packing space; a gland sleeve in threaded engagement with the inner wall of said box and comprising a cylindrical portion having an internal diameter larger than the external diameter of the object and having an integral flange turned in at its forward end but with clearance from said object; in combination with a sheet metal bush having a cylindrical midportion within said flange adapted to afford a bearing for said object, an integral forward out-turned flange substantially at right angles to the axis of the box to apply frontal pressure on the packing when the sleeve is advanced, and an integral rear portion out-turned behind the flange of the sleeve to cause the bush to be withdrawn when the sleeve is withdrawn, while leaving the bush free from rotation with the sleeve.

2. In a stuffing box having a gland structure as defined in claim 1, the construction in which the gland is of sheet metal and has an integral outward flange at its rear and shaped to receive a wrench.

JAMES M. G. FULLMAN.